(12) United States Patent
Wright

(10) Patent No.: US 12,506,813 B2
(45) Date of Patent: *Dec. 23, 2025

(54) MAPPING GUI DIGITAL CONTENT INTO TRACKING REQUIREMENTS TO GENERATE PERFORMANCE INDICATORS

(71) Applicant: Truist Bank, Charlotte, NC (US)

(72) Inventor: David Wright, Roswell, GA (US)

(73) Assignee: TRUIST BANK, Charlotte, NC (US)

( * ) Notice: Subject to any disclaimer, the term of this patent is extended or adjusted under 35 U.S.C. 154(b) by 206 days.

This patent is subject to a terminal disclaimer.

(21) Appl. No.: 18/305,598

(22) Filed: Apr. 24, 2023

(65) Prior Publication Data

US 2024/0357018 A1 Oct. 24, 2024

(51) Int. Cl.
| | |
|---|---|
| *H04L 67/306* | (2022.01) |
| *G06Q 20/40* | (2012.01) |
| *H04L 67/146* | (2022.01) |
| *H04L 67/50* | (2022.01) |

(52) U.S. Cl.
CPC ....... *H04L 67/535* (2022.05); *G06Q 20/4016* (2013.01); *H04L 67/146* (2013.01); *H04L 67/306* (2013.01)

(58) Field of Classification Search
CPC .................................................... H04L 67/535
See application file for complete search history.

(56) References Cited

U.S. PATENT DOCUMENTS

| | | | |
|---|---|---|---|
| 11,829,456 B1 * | 11/2023 | Slavin et al. ........... | G06F 21/16 |
| 2013/0073387 A1 | 3/2013 | Heath | |
| 2013/0191213 A1 * | 7/2013 | Beck et al. ........ | G06Q 30/0267 |
| 2014/0108977 A1 * | 4/2014 | Queck et al. ........... | G06F 3/048 |
| 2018/0101863 A1 * | 4/2018 | Fadeev et al. ...... | G06Q 30/0248 |
| 2018/0146253 A1 * | 5/2018 | Louboutin ......... | H04N 21/4668 |
| 2024/0015173 A1 * | 1/2024 | Putnam et al. ..... | H04L 63/1425 |

* cited by examiner

*Primary Examiner* — James J Debrow
(74) *Attorney, Agent, or Firm* — Michael A. Springs, Esq.; Shumaker, Loop & Kendrick, LLP; Patrick B. Horne

(57) ABSTRACT

A system for automating GUI digital content tracking is used to conduct a back end navigation event in which partitioned digital content blocks are sequentially displayed via an agent GUI. The system receives, in the back end navigation event, in association with at least some of the displayed partitioned digital content blocks, respective agent inputs indicating tracking markers within the partitioned digital content blocks. The system further establishes automated tracking of downstream user navigation events in which the partitioned digital content blocks are displayed in user GUIs, and generates tracking data including quantifications of user interactions, in the tracked downstream user navigation events, with the indicated tracking markers. At least a portion of the tracking data is displayed in a back end evaluation event.

20 Claims, 5 Drawing Sheets

MAPPING GUI DIGITAL CONTENT INTO TRACKING REQUIREMENTS TO GENERATE PERFORMANCE INDICATORS

TECHNICAL FIELD

The present disclosure relates to tools for evaluating user navigation of digital content. More particularly, the present disclosure relates to implementing automated tracking of user navigation events for later evaluation and content improvement accordingly.

BACKGROUND

Consumers increasingly turn to computing devices, including smart phones, to peruse their options in making purchases and choosing service providers. The entities providing the content accessed by consumers typically have little information on how that content is used and what of it results in purchases and other engagements. Product and service providers often request feedback from consumers with inquiries of whether they were found online, through advertising, or word of mouth. But replying to such inquiries is typically optional, and busy consumers often fail to reply.

Online activities such as purchases, payments, and billings are increasingly intended and expected to be conducted with convenience and with as few keystrokes and as little searching as feasible, particularly when small devices are used, such as mobile phones. Thus, as ever before and perhaps even more so when a few clicks are expected by consumers to accomplish their goals, feedback about user interaction with digital content is needed by content providers.

Improvements are needed to inform content providers of what content is useful to consumers, and what content leads to user interactions.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

According to at least one embodiment, a system for automating GUI digital content tracking includes: at least one processor; a communication interface communicatively coupled to the at least one processor; and at least one memory device storing executable code that, when executed, causes the at least one processor to: conduct a back end navigation event; sequentially display, in the back end navigation event via an agent GUI, partitioned digital content blocks; and receive, in the back end navigation event, in association with at least some of the displayed partitioned digital content blocks, respective agent inputs indicating tracking markers within the partitioned digital content blocks. The at least one processor further establishes automated tracking of downstream user navigation events in which the partitioned digital content blocks are displayed in user GUIs, and generates tracking data including quantifications of user interactions, in the tracked downstream user navigation events, with the indicated tracking markers. At least a portion of the tracking data is displayed in a back end evaluation event.

In at least on example, at least one of the partitioned digital content blocks in which at least one tracking marker is indicated includes at least one of web page content and mobile app page content.

The at least one tracking marker can be, as non-limiting examples, a link, a button, a check box, and a text box.

The quantifications of user interactions with the determined tracking markers may include enumerations of web page visits, browsing trajectory data, and client conversion data.

The downstream user navigation events may include browsing events of multiple users.

In some examples, the executable code, when executed, further causes the at least one processor to: determine, using the tracking data, group signal profiles each aggregated from a respective segment of the multiple users, the group signal profiles including at least a fraudulent activity profile and a confirmed-purchaser profile; implement segmentation of at least some user navigation events as suspected fraud attempt events according to the fraudulent activity profile; and implement segmentation of at least some other user navigation events as likely purchase events according to the confirmed-purchaser profile.

Implementing segmentation of at least some user navigation events as suspected fraud attempts may include restricting at least one of content access and account changes.

In at least one embodiment, to which the above examples apply as well, a method is provided for a computing to automate GUI digital content tracking, the computing system including one or more processor, and at least one memory device storing computer-readable instructions, the one or more processor configured to execute the computer-readable instructions. The method includes, upon execution of the computer-readable instructions: conducting a back end navigation event; sequentially displaying, in the back end navigation event via an agent GUI, partitioned digital content blocks; receiving, in the back end navigation event, in association with at least some of the displayed partitioned digital content blocks, respective agent inputs indicating tracking markers within the partitioned digital content blocks; establishing automated tracking of downstream user navigation events in which the partitioned digital content blocks are displayed in user GUIs; generating tracking data including quantifications of user interactions, in the tracked downstream user navigation events, with the indicated tracking markers; and displaying at least a portion of the tracking data in a back end evaluation event.

In at least one embodiment, to which the above examples apply as well, a computing system for automating GUI digital content tracking includes: at least one processor; a communication interface communicatively coupled to the at least one processor; and at least one memory device storing executable code. When executed, the code causes the at least one processor to: display, in an agent navigation event via an agent GUI, digital media contents; receive, in the agent navigation event, respective agent inputs indicating selected portions of the digital media contents for user-navigation tracking; establish automated tracking of downstream user navigation events in which the digital media contents are displayed in user GUIs; generate tracking data regarding user interactions, in the tracked downstream user navigation events, with the selected portions of the digital media contents; determine, using the tracking data, group signal profiles each aggregated from a respective segment of the multiple users, the group signal profiles including at least a fraudulent activity profile; and implement segmentation of at least some user navigation events as suspected fraud attempt events according to the fraudulent activity profile by restricting at least one of content access and account changes.

The above summary is to be understood as cumulative and inclusive. The above described embodiments and features are combined in various combinations in whole or in part in one or more other embodiments.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTIONS

Figure 1:
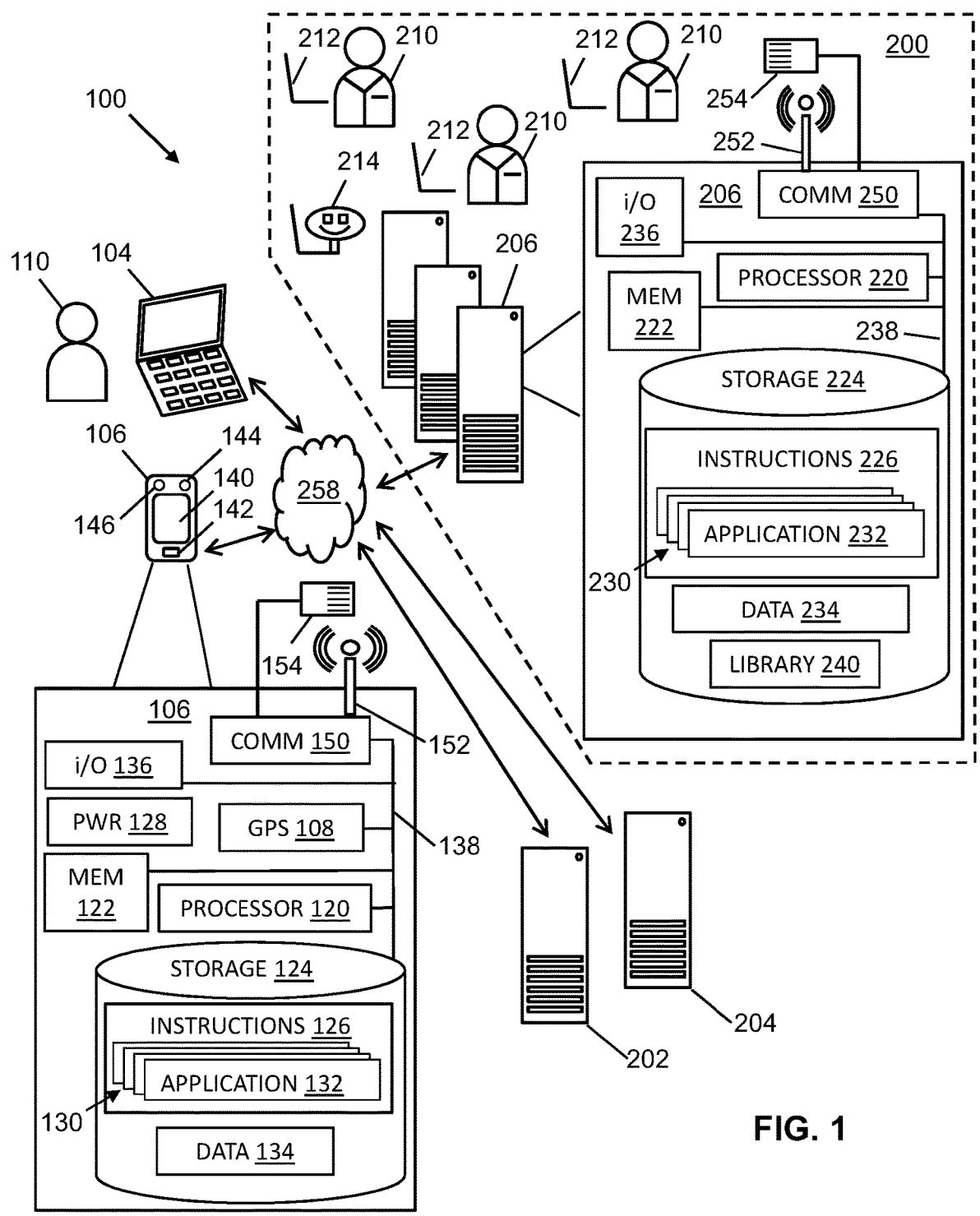
FIG. 1 illustrates an enterprise system and environment thereof, in accordance with various embodiments of the present invention.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to illustrations and/or block diagrams of systems and apparatuses (the term "apparatus" includes systems and computer program products), will be understood such that each function described or implied with reference to the illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts described, illustrated, and/or implied.

These computer program instructions may also be stored in a computer-readable memory that can direct a computer or other programmable data processing apparatus to function in a particular manner, such that the instructions stored in the computer readable memory produce an article of manufacture including instructions, which implement the function/act described, illustrated, and/or implied.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts described, illustrated, and/or implied. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein. Where functions of hardware and software are described herein, related methods are detailed therewith, such that methods are disclosed as well.

FIG. 1 illustrates a system 100 and environment thereof, according to at least one embodiment, by which a user 110 benefits through use of services and products of, or those provided at least in part with use of, an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third and fourth party systems such as merchant systems configured to interact with the user device 106 during transactions and also configured to interact with the enterprise system 200 in back-end transactions clearing processes.

In certain embodiments, one or more of the systems and devices, such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

The above-described devices and systems facilitate and implement computerized automation at least in part of a digital measurement planning process to assist agents in mapping digital property, such as web page content, mobile app content, and other digital media, to be, for example, disseminated to users. Marketing business objectives are mapped into technical tracking requirements that result in relevant performance metrics. In at least one example of a digital measurement planning process, an agent digital analyst walks through the visual design of a web or app page and related flow. In the initial stages of the process, the inventory of pages are defined and named. Within each page, the digital agent analyst works with a business or marketing agent to determine and select what relevant actions (e.g. button click) on a given page should be stored and in what analytic dimension or metric. These digital analytics dimensions or metrics, which can be termed tracking markers, are then used in performance reporting which maps to the business objective. The process results in a document artifact referred to as the measurement plan, the use of which in tracking user events such as the browsing or other access of web site and mobile app content generates tracking data quantifying user interactions with the selected tracking markers.

This process and related documentation artifact help translate the business objectives into technical digital analytics requirements. They can be referenced by a digital analyst to determine exactly how and where specific dimension and metric data are stored when users perform different actions on a digital property such as a web site or mobile app. This provides a competitive advantage using a novel and unique process and related documentation for digital measurement, for example to serve as feedback to the design and arrangement of media content.

A staged approach underlying realized systems and methods can be described as entailing: requirements gathering, with reference to conception of objectives and back end agent navigation events by which digital content is partitioned and reviewed; tracking plan creation, with reference to agents indicating tracking markers to select portions of digital media contents for user-navigation tracking; implementing web code to establish automated tracking of downstream user navigation events; testing and validation of data, for example group signal profiles may be determined by aggregation of action characteristics of multiple users in groups that can be discerned such as users that make purchases, open accounts, and deepen engagement by conversion; and, reporting and gauging, with reference to back end evaluation events in which tracking data can be analyzed and displayed.

Figure 2:
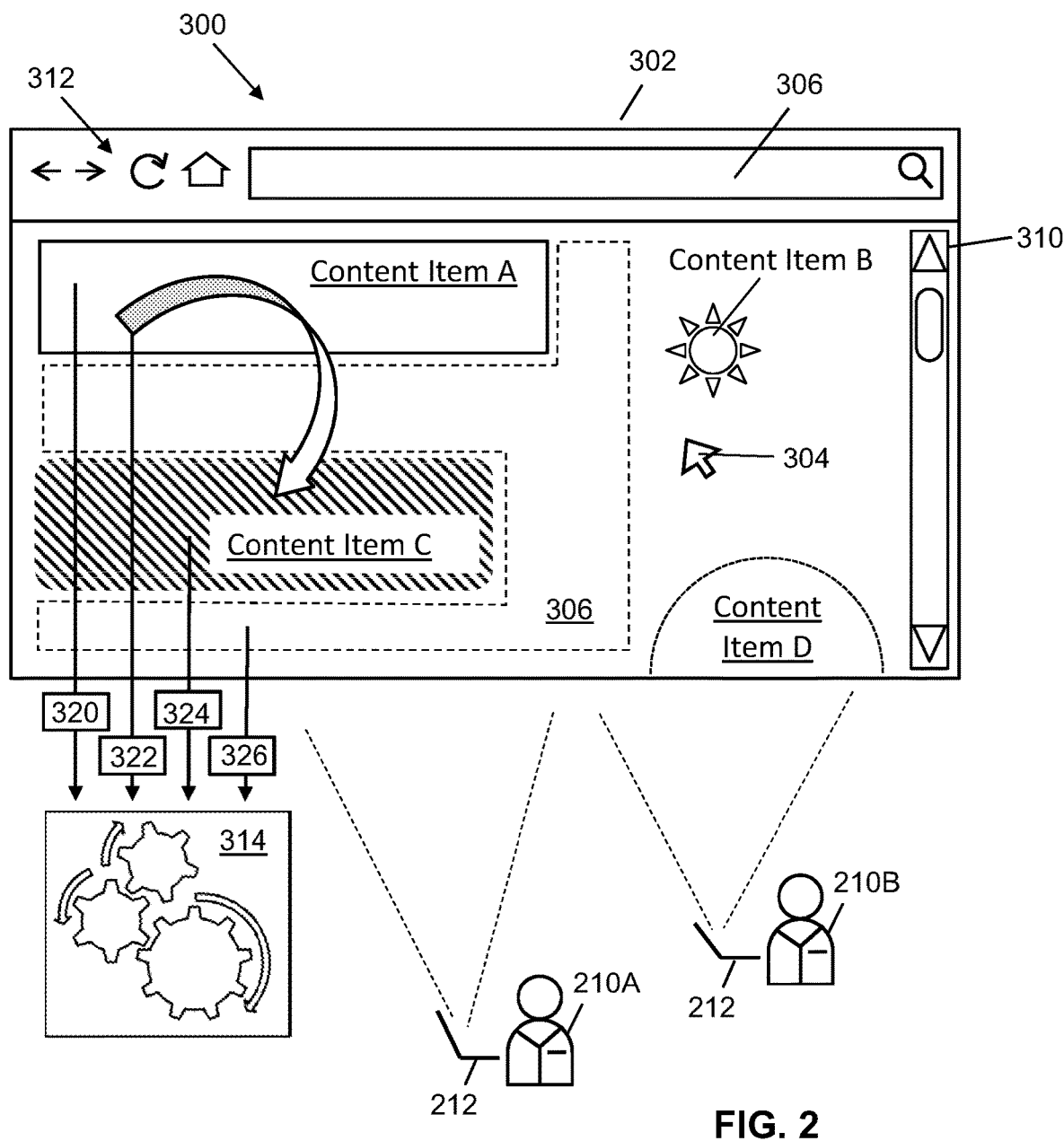
FIG. 2 represents a back end navigation event in which partitioned digital content blocks are displayed and tracking markers are indicated to establish automated tracking according to at least one embodiment.

FIG. 2 represents a navigation event 300 in which partitioned digital content blocks are displayed. The navigation event can be characterized as a back end event in that agents 210A and 210B are in attendance without users 110 (FIG. 1). With respect to an above described example, the agent 210A may be a digital agent analyst and the agent 210B may be a business or marketing agent. Toward automating GUI digital content tracking, a digital content block 302 is displayed for selection of what content therein is to be marked for later tracking of user interaction therewith. The agents 210A and 210 utilize respective agent devices 212, each including or defining an agent GUI, to conduct collaborative browsing or access in which one or both guide navigation and they act singly or collaborate to provide inputs indicating tracking markers within displayed content blocks. The express illustration of two agents, agent 210A and agent 210B, is made for example only. In some examples, more or less agents may attend the described back end session 300.

As illustrated, the partitioned digital content blocks can be include or be web pages and mobile app pages, each having respective contents, and may be viewed sequentially in a browsing session. The content therein selected for later tracking of user interaction, or tracking markers, can include a link, a button, a check box, a text box, a thumbnail, an image, a graphic, a video, and other actionable or accessible media content items.

The expressly illustrated content block 302 in FIG. 2 is shown as a web page. Agent inputs are enabled for example via various input devices as described above with reference to FIG. 1. In FIG. 2, agent input is illustrated in part as navigation of a marker 304 which represents a cursor, a finger touch position, and a stylus position in various examples. Content items referenced in FIG. 2 as Content Item A, Content Item B, Content Item C, and Content Item D are each available for selection as tracking markers according to what contents are agent preferred for tracking. Navigation tools such as an address bar 306, and a scroll tool 310 are also content items available for selection as tracking markers. The navigation tools 312 (back, forward, reload, home) near the address bar are available for selection as tracking markers. The use of these by users represents user choices and trajectories in accessing content, and thus tracking user interactions with such content items is of interest to content providers, service provides, developers, service providers, and other agents to determine the efficacy of the content items and their arrangement.

Figure 3:
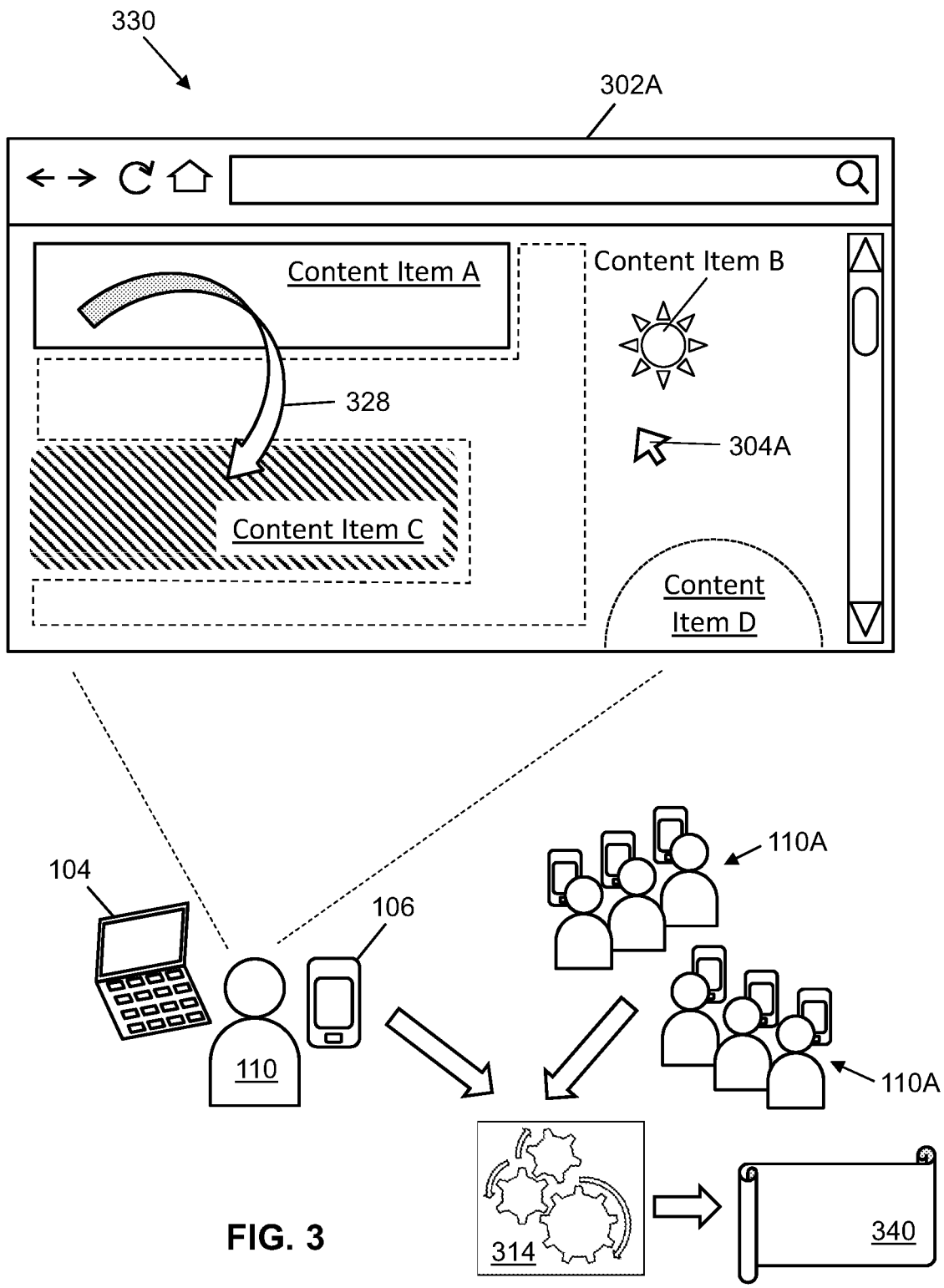
FIG. 3 represents a user navigation event in which tracking data is generated to quantify user interactions with the tracking markers according to at least one embodiment.

Trajectory information can be selected and subject to tracking markers as well, for example as represented as movement of focus, such as by cursor or other navigational control, from Content Item A to Content Item C. Accordingly, as represented in FIG. 3, Content Item A is indicated as a tracking marker and a corresponding component 320 is added to automated tracking 314. Similarly, a component 322 corresponding to movement of focus 328 such as navigation within the content block is added to automated tracking 314 to collect trajectory information of user activities within the content block 302. A user's trajectory information includes web browsing trajectories and other sequences of actions and interactions, and can include timestamped visiting activities. Content browsing trajectories can reveal user preferences, whether content provided to users is easily understood, whether closures of help requests are reached, and whether user browsing leads to purchases of services and products, such as whether users open accounts and/or demonstrate other conversion or conversion likely characteristics.

Continuing with the illustrated example, Content Item C is indicated as a tracking marker and a corresponding component 324 is added to automated tracking 314, and hovering or other focus or action within an interstitial area 306 is indicated as a tracking marker and a corresponding component 326 is added to automated tracking 314. Thus, a robust variety of actions and interactions with digital content are within the scope with these descriptions with regard to what can be indicated as tracking markers and what downstream user activities can be subject to automated tracking established via the indicated tracking markers.

The referenced components and the automated tracking 314 represent software and data elements such as, in non-limiting examples, computer-executable instructions, programs, programming statements, executable code, source code, object code, binary code, lines of code, lines in a table, lines in spreadsheet, cells in a multi-dimensional data object, instructional code, machine-level code, an application, apps, routines, subroutines, modules, and computerized, at least in part, actions, methods, and activities.

Figure 4:
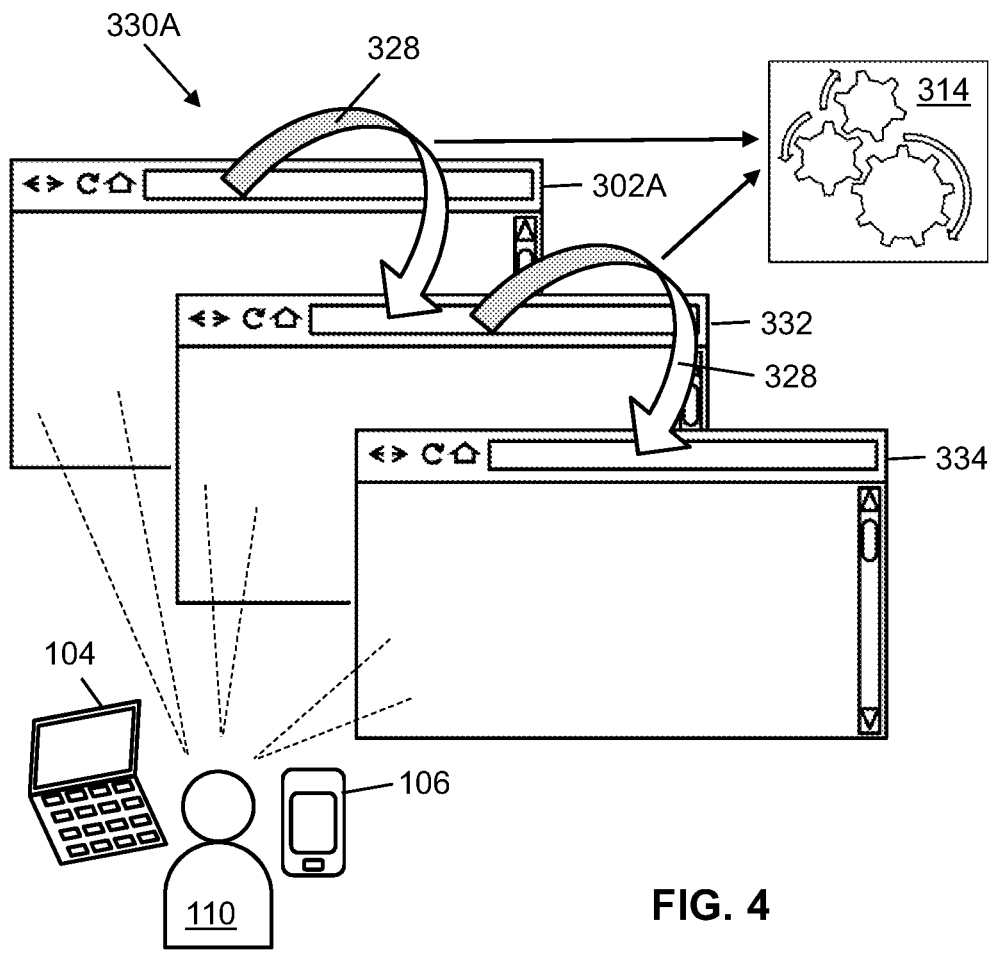
FIG. 4 represents further user navigation and the collection of user trajectory data by automated tracking according to at least one embodiment.

The components corresponding to respective tracking markers implement the automated tracking 314 of downstream user navigation events in which the partitioned digital content blocks are displayed in user GUIs. FIG. 3 expressly represents the content block 302A, whereas FIG. 4 further illustrates additional content blocks 332, and 334, which are shown as sequentially displayed in a downstream user navigation event. Thus, any number of content blocks, and variety types thereof, can contain of include tracking markers for selection by agents in a back end navigation event, such as the illustrated event 300 of FIG. 2, and by selection of the tracking markers by agent inputs, automated tracking is ultimate established toward or upon downstream user navigation events, for example as illustrated in FIGS. 3 and 4.

FIG. 3 represents, in particular, a downstream user navigation event 330 in which a user 110 navigates the content block 302A shown has a web page, the corresponding back end version of which, content block 302, is shown in FIG.

2, and for which agent inputs indicated tracking markers among the content blocks and automated tracking 314 is established. The user 110 utilizes one or more user device, referring to either or both of the computing device 104 and the mobile device 106, each including or defining a user GUI, to conduct browsing or access of, for example, content stored and disseminated via library 240 (FIG. 1).

The user 110 conducts the event 330, represented as browsing the content of content block 302A, for example to access, investigate, consume, analyze, download, and/or utilize the content, for further example toward benefiting from services and products provided at least in part by or at least at least in part through the enterprise system 200. The system 200, in non-limiting examples, is that of an, is operated by, and/or is associated with an entity that provides financial services and operates as a financial institution. For example the entity may engage the user in a range of services such as checking, credit card, debit card, mortgages, investments, and savings account services.

The content block 302 (FIG. 2) and the content block 302A (FIG. 3) are similarly illustrated and separately referenced acknowledging that in some examples that same or similar contents are differently displayed in back end agent navigation events relative to downstream user navigation events. For example, a back end agent navigation event may be conducted in graphical browsing form as represented in FIG. 2, and can alternatively or additionally be conducted in whole or in part in tabular form and/or file navigation form, and may or may not include actual full display of, for example, image elements and video elements, instead having representative indicia and/or listings thereof for user by coders, developers, digital agent analysts, business agents, marketing agents, and other back end agents.

In FIG. 3, user navigation and input is illustrated in part by a marker 304A which represents a cursor, a finger touch position, and a stylus position in various examples. Content items referenced in FIG. 3 as Content Item A, Content Item B, Content Item C, and Content Item D are each available for user interaction, such as clicking and marker hovering. Tracking data 340 is generated during the user navigation event 330 when the user interacts with those portions of the content block 302A indicated as tracking markers. In the express example of FIG. 2, Content Item A, Content Item C, and user movement of focus 328 were each indicated as a tracking marker and a corresponding component was added to automated tracking 314. Accordingly, the tracking data 340 includes quantifications of user interactions, in the tracked downstream user navigation event 330, with the indicated tracking markers. Quantification of user interactions can be a counting or other representation in numerical form, statistical form, index form, and logic form, and can be generated for each particular user and/or as an accumulation among multiple users, as represented in FIG. 3, with reference to users 110A each similarly conducting user navigation events using respective user devices.

FIG. 4 illustrates further navigation and user interaction with additional content blocks 332 and 334, each shown for example as a web page. Movements of focus 328 such as navigation within among the content blocks in this example have been added to automated tracking 314 to collect trajectory information of user activities. The event represented in FIG. 4 is referenced as a downstream user navigation event 330A, noting this example can represent a continuation of the user navigation event 330 of FIG. 3 or other event conducted by the same or another user. FIG. 4 illustrates that trajectory data, for example detailing user navigation and sequential displays of content blocks such as web and app pages and other partitioned digital content blocks can be included in the tracking data 340 (FIG. 3) via automated tracking 314.

Figure 5:
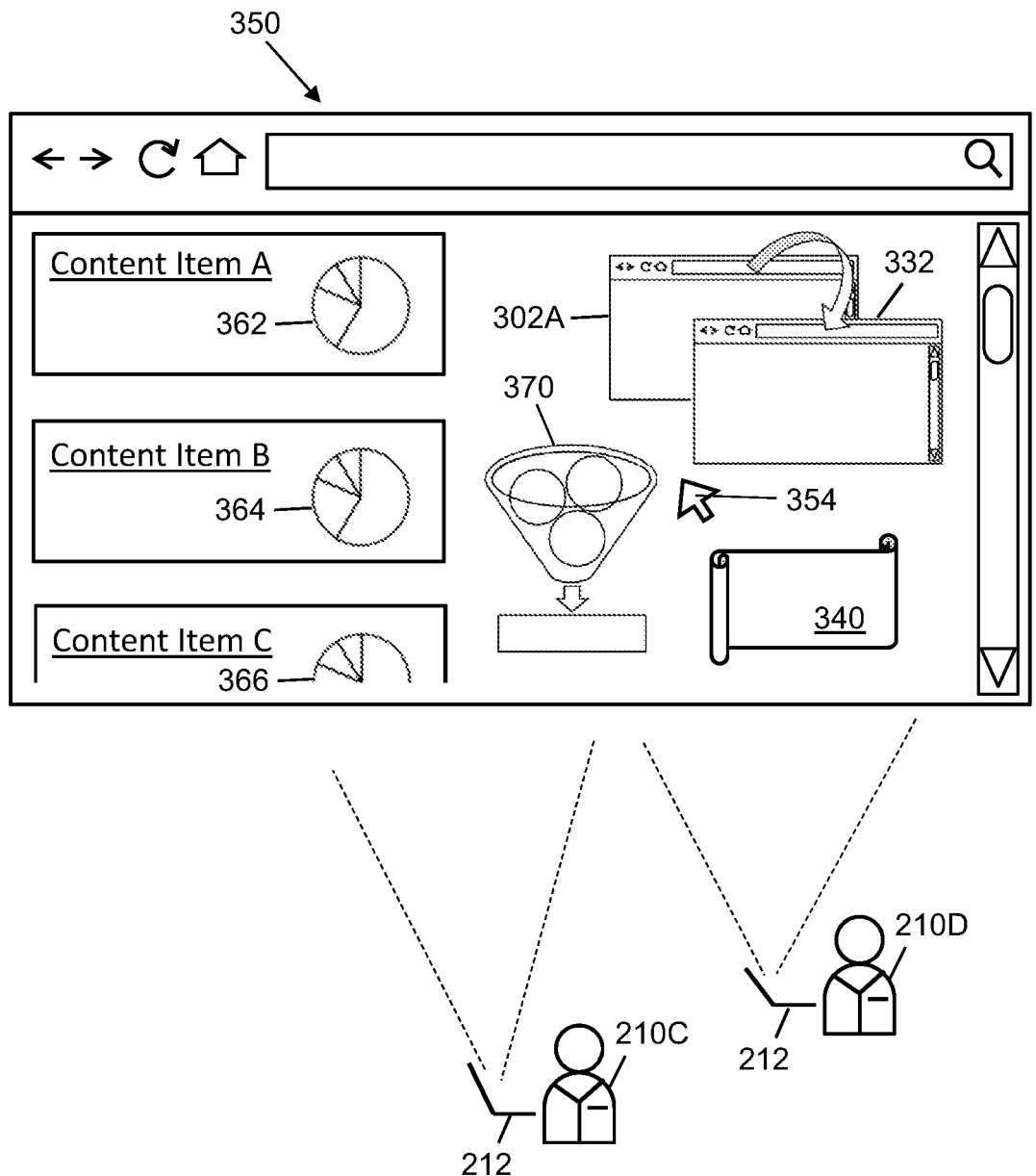
FIG. 5 represents a back end evaluation event in which at least a portion of the tracking data is displayed according to at least one embodiment.

FIG. 5 represents a back end evaluation event 350 in which at least a portion of the tracking data 340 is displayed, for example on one or more agent GUI via agent devices 212. The evaluation event can be characterized as a back end event in that agents 210C and 210D are in attendance without users 110. With respect to an above described example, the agent 210C may be a digital agent analyst and the agent 210D may be a business or marketing agent, for example with reference to agents 210A and 21B. Toward evaluating the tracking data 340 generated by automated tracking 314, the digital content blocks 302A and 332 are displayed at least in part the illustrated example evaluation event 350. The agents 210A and 210 may conduct collaborative browsing or access in which one or both guide navigation and they act singly or collaborate to view and utilize the tracking data 340. The express illustration of two agents, agent 210C and agent 210D, is made for example only. In some examples, more or less agents may attend the described back end session 300. In FIG. 5, agent navigation is illustrated in part as navigation of a marker 354 which represents a cursor, a finger touch position, and a stylus position in various examples.

The tracking data 340 can be displayed in whole or in part in various formats and portions in the evaluation event 350. Tracking data detailing user interactions with particular content items, with reference to displays of tracking data associated with Content Item A, Content Item B, and Content Item C, is presented as respective pie charts 362, 364, and 366 in the illustrated example. The quantifications of user interactions in the generated tracking data can be displayed for agent viewing and evaluation in various data presentation forms, including, as non-limiting examples, pie charts, histograms, bar charts, data plots, timelines, statistical data, tabular data, written reports, text statements, numerical data, forecasts, summaries, spreadsheets, cross sections of multi-dimensional data objects, and other examples of presentation of quantities and findings.

Back end evaluation of the tracking data can provide feedback to the design and arrangement of media content. Developers, coders, and other agents can be informed of what content elements are utilized and preferred by consumers and make content design changes accordingly. Tracking data for multiple users can be used to determine group signal profiles each aggregated from a respective segment of the multiple users. As non-limiting examples, the group signal profiles can include a fraudulent activity profile and a confirmed-purchaser profile.

A fraudulent activity profile can be aggregated from confirmed or suspected fraudulent activities, such as multiple failed logins, failed attempts to change established user data, and repudiation from a third party validation service entity with respect user contact information. Some businesses and other entities maintaining user accounts turn to third party service providers to confirm user identities and contact information, particularly when changes to user account details such as contact information items are requested. Fraudulent schemes vary in their strategies, some of which entail repeated attempts or iterative or high-volume attempts, executed for example by malicious code or other programming, to access accounts, open accounts, and/or alter data. A validation service can provide validations and/or repudiations of secure connection settings such as consumer email addresses, phone numbers and other connection and contact modes. Validations attest to whether a requested new value for a secure connection setting is accurate, genuine and current. Repudiations can indicate that a requested new value for a secure connection setting is inaccurate, disingenuous, obsolete, and/or outdated, thus possibly representing a fraudulent or erroneous attempt to alter contact information. However, such third parties may charge a fee for each confirmation or denial, or may charge for periodic subscriptions with limits on usage or rates that vary according to volume. Thus, an aggregated or otherwise developed fraudulent activity profile can be used to implement segmentation of at least some user navigation events as suspected fraud attempt events according to the fraudulent activity profile. Implementing segmentation may include restricting content access and restricting account changes. For example, when fraud is suspected, a user or a user's navigation event may be restricted from: accessing user accounts, making contact information changes, and withdrawing, moving and/or otherwise affecting user funds.

A confirmed-purchaser profile can be aggregated from tracking data associated with users who progressed to conversion, with reference to making purchases of products and services, such as opening accounts, taking loans, acquiring mortgages and other activities of deepening engagement with a service entity conducting the automated tracking and evaluation. Thus, an aggregated or otherwise developed confirmed-purchaser profile can be used to implement segmentation of at least some user navigation events as conducted by potentially high-benefit customers.

In various embodiments, users are organized into categories and guided toward purchase considerations and decisions in staged interactions by which awareness-stage information is broadcast to a wide audience, and sequential interactions increasingly refine the recipient list for further outgoing information, inquiries, and guides. User entities, by their own continued interactions, replies, and inquiries implemented as user actions via user devices, are guided through a category funnel, 370 referenced graphically in FIG. 5, toward a conversion-stage category representing receipt, use, subscription, or purchase of one or more service or product by the user. The category funnel approach implemented by systems and methods described herein provides a mechanism for structuring personalization and prioritizing some user and their events.

The narrowing nature of progress along the category funnel permits refining of the target audience of staged outgoing communications and content sent by an enterprise entity offering services and products for conversion. Network data traffic is thus reduced in comparison to wider casting of all stages of categorized information. Users having received certain information, such as basic promotional content with general reference to available services and products, need not redundantly receive that information after interactions with providers have evolved and, for example, requests for purchase or subscription have been made. Deepening interactions between users and providers tend to involve increasingly smaller audiences relative to the public at large according to the advantages of the systems and methods described herein, and the data trafficked across networks between users and providers is thus reduced. From the user perspective, this advantageously personalizes interactions and empowers providers to better manage client relationships.

By providing feedback about user interaction with digital content via the tracking data and back end evaluation, content providers can improve the efficiency of their content by improving arrangement of content to, for example, minimize navigational steps to content user prefer or frequent. This conserves network resources, improves communication networks and systems efficiencies, reduces costs, and lowers energy consumption. Data traffic on network connections is reduced, improving network efficiencies, and reducing latencies and operating costs.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A system for automating GUI digital content tracking, the system comprising:
   at least one processor;
   a communication interface communicatively coupled to the at least one processor; and
   at least one memory device storing executable code that, when executed, causes the at least one processor to:
      conduct a back end navigation event;
      sequentially display, in the back end navigation event via an agent GUI, partitioned digital content blocks;
      receive, in the back end navigation event, in association with at least some of the displayed partitioned digital content blocks, respective agent inputs indicating tracking markers thereby selecting within the partitioned digital content blocks particular partitioned digital content blocks to be tracked;
      establish automated tracking of downstream user navigation events in which the partitioned digital content blocks are displayed in user GUIs;
      generate tracking data comprising quantifications of user interactions, in the tracked downstream user navigation events, with the selected particular partitioned digital content blocks; and
      display at least a portion of the tracking data in a back end evaluation event.

2. The system of claim 1, wherein at least one of the selected particular partitioned digital content blocks comprises at least one of web page content and mobile app page content.

3. The system of claim 2, wherein the at least one selected particular partitioned digital content blocks comprises at least one of a link, a button, a check box, and a text box.

4. The system of claim 3, wherein the quantifications of user interactions with the selected particular partitioned digital content blocks comprise at least one of enumerations of web page visits, browsing trajectory data, and client conversion data.

5. The system of claim 1, wherein the downstream user navigation events comprise browsing events of multiple users.

6. The system of claim 5, wherein the executable code, when executed, further causes the at least one processor to:
   determine, using the tracking data, group signal profiles each aggregated from a respective segment of the multiple users, the group signal profiles comprising at least a confirmed-purchaser profile; and
   implement segmentation of at least some user navigation events as likely purchase events according to the confirmed-purchaser profile.

7. The system of claim 6, wherein implementing segmentation of at least some user navigation events as likely purchase events comprises transmitting staged outgoing digital signals to corresponding users, the outgoing digital signals comprising digital content offering services and products.

8. A computing system for automating GUI digital content tracking, the system comprising:
   at least one processor;
   a communication interface communicatively coupled to the at least one processor; and
   at least one memory device storing executable code that, when executed, causes the at least one processor to:
      display, in an agent navigation event via an agent GUI, digital media contents available for selection for user-navigation tracking;
      receive, in the agent navigation event, respective agent inputs that indicate portions of the digital media contents selected for user-navigation tracking;
      establish automated tracking of downstream user navigation events of multiple users in which the digital media contents are displayed in user GUIs;
      generate tracking data regarding user interactions, in the tracked downstream user navigation events, with the selected portions of the digital media contents selected for user-navigation tracking;
      determine, using the tracking data, group signal profiles each aggregated from a respective segment of the multiple users; and
      implement segmentation of at least some user navigation events according to the group signal profiles.

9. The system of claim 8, wherein the digital media contents comprise at least one of web page content and mobile app page content.

10. The system of claim 9, wherein the portions of the digital media contents selected for user-navigation tracking comprise at least one of a link, a button, a check box, and a text box.

11. The system of claim 8, wherein the tracking data comprises at least one of enumerations of web page visits, browsing trajectory data, and client conversion data.

12. The system of claim 8, wherein the code, when executed, further causes the at least one processor to implement segmentation of at least some user navigation events as likely purchase events according to the confirmed-purchaser profile.

13. A method for a computing to automate GUI digital content tracking, the computing system including at least one processor and at least one memory device storing computer-readable instructions, the at least one processor configured to execute the computer-readable instructions, the method comprising, upon execution of the computer-readable instructions:
   conducting a back end navigation event;
   sequentially displaying, in the back end navigation event via an agent GUI, partitioned digital content blocks;
   receiving, in the back end navigation event, in association with at least some of the displayed partitioned digital content blocks, respective agent inputs indicating tracking markers thereby selecting within the partitioned digital content blocks particular partitioned digital content blocks to be tracked;
   establishing automated tracking of downstream user navigation events of multiple users in which the partitioned digital content blocks are displayed in user GUIs;
   generate tracking data comprising quantifications of user interactions, in the tracked downstream user navigation events, with the selected particular partitioned digital content blocks; and
   displaying at least a portion of the tracking data in a back end evaluation event.

14. The method of claim 13, wherein at least one of the selected particular partitioned digital content blocks comprises at least one of web page content and mobile app page content.

15. The method of claim 14, wherein the at least one selected particular partitioned digital content block comprises at least one of a link, a button, a check box, and a text box.

16. The method of claim 15, wherein the quantifications of user interactions with the selected particular partitioned digital content blocks comprise at least one of enumerations of web page visits, browsing trajectory data, and client conversion data.

17. The method of claim 13, wherein the method further comprises:
   determining, using the tracking data, group signal profiles each aggregated from a respective segment of the multiple users, the group signal profiles comprising at least a confirmed-purchaser profile; and
   implementing segmentation of at least some other user navigation events as likely purchase events according to the confirmed-purchaser profile.

18. The method of claim 17, wherein implementing segmentation of at least some user navigation events as likely purchase events comprises prioritizing corresponding users events.

19. The method of claim 17, wherein implementing segmentation of at least some user navigation events as likely purchase events comprises transmitting staged outgoing digital signals to corresponding users, the outgoing digital signals comprising digital content offering services and products.

20. The method of claim 17, wherein the confirmed-purchaser profile is aggregated from events representing receipt, use, subscription, or purchase of one or more service or product.

* * * * *